United States Patent Office 2,820,677
Patented Jan. 21, 1958

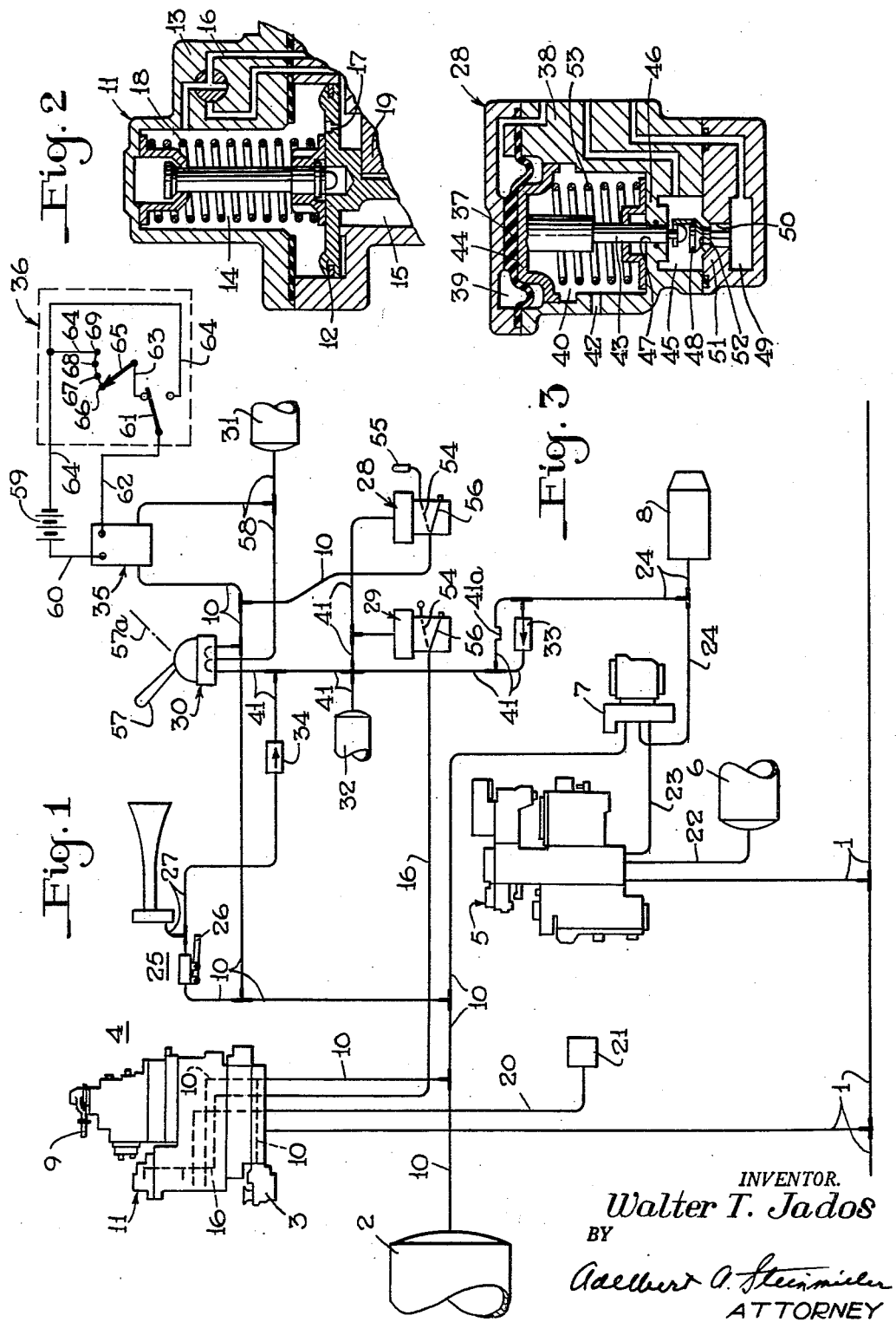
Jan. 21, 1958  W. T. JADOS  2,820,677
FLUID PRESSURE BRAKE APPARATUS WITH SAFETY CONTROL FEATURE
Filed Jan. 26, 1954
INVENTOR.
Walter T. Jados
BY
Adelbert O. Steinmiller
ATTORNEY

2,820,677

FLUID PRESSURE BRAKE APPARATUS WITH SAFETY CONTROL FEATURE

Walter T. Jados, Berwyn, Ill., assignor to Westinghouse Air Brake Company, Wilmerding, Pa., a corporation of Pennsylvania Application January 26, 1954, Serial No. 406,145

10 Claims. (Cl. 303—19)

This invention relates to fluid pressure brake apparatus and more particularly to the type embodying automatic safety control features.

Modern railway locomotives are commonly provided with a fluid pressure brake apparatus comprising a so-called "dead man" or safety control valve device which is operative to cause a safety control application of the locomotive brakes unless a foot or manually operated lever is depressed by the engineman at all times except under certain conditions during manually initiated brake applications. If the engineman places a tool box or other object on this lever or if he should be stricken and slump in such a way as to maintain said lever depressed, the safety control feature can be rendered completely inoperative.

It is therefore an object of this invention to provide an improved brake apparatus embodying a safety control arrangement which will prevent continuous nullification of the safety control feature.

Another object is to provide a safety control arrangement which requires periodic, but not continuous, operation or acknowledgment by the engineman and will not cause a safety control application of the locomotive brakes if his foot or hand is momentarily removed from the lever.

A further object is to provide a safety control arrangement which does not require such periodic operation or acknowledgment under a variety of conditions in which the alertness of the engineman is demonstrated by the performance of other acts.

According to the aforementioned objects, novel means are provided on the locomotive which require periodic, but not continuous, actuation by the engineman and warn him in advance when such actuation is required so as to afford him a reasonable time, if he is alert, to actuate said means and thereby prevent undesired safety control applications of the locomotive brakes. Optional means are provided for automatically suppressing the safety control feature not only during a manually initiated service, emergency or independent application of the locomotive brakes, but also while and for a short period after the usual horn is sounded or the locomotive is standing, reversing or proceeding ahead within a low speed range.

Other objects and advantages will become apparent from the following more detailed description of the invention.

In the accompanyink drawing: Fig. 1 is a diagrammatic view of a portion of a brake apparatus embodying the invention; Fig. 2 is an enlarged, sectional view of a portion of an engineer's automatic brake valve device shown in outline in Fig. 1; and Fig. 3 is an enlarged, sectional view of a pneumatic cut-off valve device shown schematically in Fig. 1.

Description

Referring to Fig. 1 of the drawing, the improved fluid pressure brake apparatus comprises the usual brake pipe 1 extending through the train and further comprises, on the locomotive, the usual main reservoir 2, feed valve device 3, engineer's automatic brake valve device 4, brake controlling valve device 5, auxiliary reservoir 6, brake cylinder relay valve device 7 and brake cylinder device 8. Since all of the components just described may, for sake of illustration, be of the perspective types employed in the No. 24–RL locomotive brake equipment shown and described in Instruction Pamphlet No. 5066 dated March 1948, of the Westinghouse Air Brake Company, the disclosure in the following description and in the accompanying drawing has been limited to only such structure and operational characteristics as are essential to a clear understanding of the invention.

Referring to Figs. 1 and 2 of the drawing, the brake valve device 4 is preferably of the type designated in the aforementioned Instruction Pamphlet as the "DSE–24 Brake Valve," which comprises, briefly, valve means (not shown) operable by movement of a handle 9 to a running position to connect the feed valve device 3 to the brake pipe 1 for charging the latter pipe with fluid under pressure from the main reservoir 2 by way of a supply conduit 10 and said feed valve device. The brake valve device 4 is operable by movement of handle 9 to a service position for effecting any desired degree of service reduction in brake pipe pressure; and to a lap position for bottling-up fluid in said brake pipe at the desired reduced pressure.

The brake valve device 4 further comprises a service application portion 11 which, as shown in Fig. 2 of the drawing, comprises a piston 12 slidably mounted in a sectionalized casing 13 and subject on one side to pressure of fluid in a chamber 14 and on the opposite side to pressure of fluid in a chamber 15. The chamber 15 is adapted to be constantly charged with fluid under pressure from the main reservoir 2 by way of a branch of supply conduit 10 (Fig. 1), whereas chamber 14 is adapted to be vented to atmosphere by way of a safety control conduit 16 or to be charged with fluid under pressure from chamber 15 by way of a bleed port 17 provided in piston 12 for permitting equalization, at a controlled rate, of the pressures of fluid in said chambers 14, 15. A spring 18 disposed in chamber 14 urges the piston 12 to a normal position for thereby defining a normal position of a slide valve 19 disposed in chamber 15 and positively connected to said piston. With the slide valve 19 in normal position, a branch of the safety control conduit 16 is blanked off and a power knockout actuating pipe 20 is vented to atmosphere. On the other hand, upon venting of fluid under pressure from the chamber 14 by way of the safety control conduit 16, the piston 12 and slide valve 19 are adapted to assume an application position, for causing a service reduction in brake pipe pressure and thereby effecting a safety control application of the locomotive brakes in the well-known manner. In application position, the slide valve 19 opens the aforementioned branch of conduit 16 to atmosphere by way of the usual lockover port (not shown), and also causes fluid under pressure to be supplied from supply conduit 10 to the power knockout actuating pipe 20 for causing the usual power knockout device 12 to cut off the power supply to the driving motors of an electric or diesel-electric locomotive, for preventing burning of the commutators in accordance with the usual practice.

Referring now to Fig. 1 of the drawing, the brake controlling valve device 5 comprises, briefly, valve means (not shown) operative in response to a service reduction in pressure in the brake pipe 1 to cause fluid under pressure to flow from the auxiliary reservoir 6 via a pipe 22 and device 5 to a pipe 23 and thence to the brake cylinder relay valve device 7 for actuating the same to supply fluid at a corresponding pressure from a branch of supply conduit 10 to a pipe 24 constantly open to the brake cylinder device 8, for thereby effecting a service application of the brakes in the well-known manner. The device 5 is operative upon an increase in brake pipe pressure to connect the brake pipe 1 to the pipe 22 for recharging the auxiliary reservoir 6 and also, at the same time, to connect pipe 23 to a vent port (not shown) in said device for thereby causing the brake cylinder relay valve device 7 to vent the brake cylinder device 8 by way of pipe 24 (which is closed to supply conduit 10 under such condition), for thereby releasing the locomotive brakes in the well-known manner.

The brake controlling valve device 5 and relay valve device 7 also cooperate, in similar manner, to supply fluid under pressure to the brake cylinder device 8 by way of pipe 24 during an emergency application of the train brakes or an independent application of the locomotive brakes, as explained in detail in the aforementioned Instruction Pamphlet.

The usual pneumatic horn device 25 comprises valve means (not shown) controlled by a manually operable lever 26. Lever 26 is normally biased to a closed position for disconnecting the supply conduit 10 from a horn actuating pipe 27; but said lever is movable to an open position for supplying fluid under pressure from said conduit to said actuating pipe for sounding the horn associated with said device.

According to the invention, a novel safety control portion is provided which comprises those components and connections not heretofore described, shown in Fig. 1 of the drawing.

The safety control portion comprises two pneumatic cut-off valve devices 28, 29; an acknowledging valve device 30, preferably manually operated; and two reservoirs 31, 32 for storing fluid under pressure, the latter reservoir, which is essentially a timing volume, being preferable but not essential. The safety control portion also preferably includes the following optional elements: two, preferably ball-type, check valve devices 33, 34; a magnet valve device 35; and a device 36 associated with the usual controller device (not shown) commonly employed for controlling speed and direction of travel of an electric or diesel-electric locomotive.

The pneumatic cut-off valve device 28 serves as a warning valve and may, for sake of illustration, be of the type shown in Fig. 3 of the drawing, which type comprises, briefly, a flexible diaphragm 37 clamped between portions of a sectionalized casing 38 and separating a control chamber 39 from a non-pressure chamber 40. The control chamber 39 is chargeable with fluid under pressure or ventable to atmosphere by way of a pipe 41 (Fig. 1) which is open to a branch of brake cylinder pipe 24 by way of a choke 41a; whereas the non-pressure chamber 40 is constantly open to atmosphere by way of a port 42 through the casing. The diaphragm 37 is operatively connected to a coaxially arranged stem 43 through the medium of a diaphragm follower 44 disposed in chamber 40. The stem 43 projects from chamber 40 into a chamber 45 through a casing partition 46 in sealing, slidably guided engagement with the wall of an aligned bore 47 through said partition. A cut-off valve 48, disposed in chamber 45 and operatively connected to the projecting end of stem 43, controls fluid pressure communication between chamber 45 and a chamber 49 by way of a bore 50 extending through a casing partition 51; said valve being adapted for seating engagement with a tapered annular seat 52 formed in said partition and encircling said bore.

In operation, when the pressure of fluid in pipe 41 is less than a predetermined value, a spring 53 disposed in chamber 40 and acting on the diaphragm follower 44 urges the diaphragm 37 and stem 43 to a normal position, in which they are shown in Fig. 3 of the drawing. In this position, the valve 48 is held unseated by the stem 43, thereby establishing a fluid pressure connection between chambers 49, 45; said connection being designated schematically in Fig. 1 by the reference numeral 54. Under this condition fluid under pressure will flow from the main reservoir 2 via a branch of conduit 10 and connection 54 of device 28 to a pneumatically actuated warning device, such as a whistle 55, for warning the engineman that the pressure in pipe 41 has reduced to the aforementioned predetermined value.

Upon supply of fluid under pressure to control chamber 39 by way of pipe 41, however, the diaphragm 37 will deflect, against resistance of spring 53, to a cut-off or suppressed position in which the valve 48 is held seated by stem 43, for thereby closing off chamber 49 from chamber 45 and thus terminating the warning signal; such disconnection, with the branch of supply conduit 10 deadended at chamber 49, being designated schematically in Fig. 1 by the reference numeral 56.

The cut-off valve device 29 serves as a safety control application valve. The structure of device 29 is preferably identical with that of device 28, except that the spring 53 of the device 29 is weaker than that of the device 28 for reasons to be explained presently. The pressure of fluid in control chamber 39 of device 29 is also controlled by way of pipe 41; but chamber 45 of said device is open to atmosphere, and chamber 49 is open to the safety control conduit 16.

Referring now to Fig. 1 of the drawing, when the pressure of fluid in pipe 41 blows down via choke 41a to the aforementioned predetermined value, the device 28 will move to normal position and actuate the whistle 55; and if the engineman fails to recharge the pipe 41 promptly and pressure in pipe 41 consequently blows down through said choke to a predetermined lower value, the device 29 will move to normal position and cause the safety control conduit 16 to be vented to atmosphere by way of connection 54 of the latter device, thereby initiating a safety control application of the locomotive brakes.

The acknowledging valve device 30 may be of any well-known type comprising valve means (not shown) operable by movement of a handle 57 to a normal position, in which it is shown, to connect a pipe 58 to the pipe 41 for causing fluid under pressure to flow from the reservoir 31 via pipes 58, 41 to the reservoir 32 and also to the control chambers 39 of the respective cut-off valve devices 28, 29; said valve means being operable by movement of said handle to a recharge position, denoted in the drawing by a dash and dot line 57a, to connect a branch of conduit 10 to the pipe 58 for thereby recharging the reservoir 31 with fluid under pressure from the main reservoir 2.

The reservoir 31 is of substantially greater capacity than the reservoir 32. Reservoir 32 is preferably provided for assuring that a sufficient volume of fluid under pressure will be available in pipe 41 to maintain the device 29 in cut-off position for a reasonable time after sounding of the whistle 55 for thereby affording the engineman an opportunity to move the handle 57 of acknowledging valve device 30 successively to recharge position and then back to normal position, without intervening occurrence of an undesired safety control application of the locomotive brakes; it being noted that during such movement of said handle, fluid pressure in the control chambers 39 of devices 28, 29 will continue to blow down toward atmosphere by way of the choke 41a if pipe 24 is devoid of fluid under pressure.

It will, of course, be obvious that instead of employing a separate reservoir or timing volume 32, the volume of the pipe 41 and chambers 39 (Fig. 2) of the devices 28 and 29 may be sufficient, in relation to the selected flow capacity of choke 41a, to maintain the device 29 in its cut-off position for a reasonable time after sounding of the whistle 55 and while the handle 57 is in its recharge position.

Since, with the structure thus far described, periodic operation of the acknowledging valve device 30 is required irrespective of whether the engineman demonstrates his alertness by the performance of some other act, the improved safety control portion preferably includes the previously designated optional elements, so that the need for such periodic operation may be desirably dispensed with when the engineman's alertness is sufficiently assured by his performance of acts, such as those hereinafter to be described.

The check valve device 33 is interposed between branches of the pipes 41 and 24 for permitting flow of fluid under pressure from pipe 24 to pipe 41 when the pressure of fluid in pipe 24 exceeds that in pipe 41 and for preventing flow of fluid under pressure in the reverse direction. The check valve device 33 is arranged in parallel with the choke 41a which permits flow of fluid under pressure, at a controlled slow rate, from pipe 41 to pipe 24.

In operation, when the locomotive brakes are released and pipe 24 is consequently vented to atmosphere by way of brake cylinder relay valve device 7, fluid pressure in the control chambers 39 of the respective devices 28, 29 will blow down to atmosphere via pipe 41 at the rate controlled by choke 41a; but when said brakes are applied, such blowdown will cease or at least be retarded. If the pressure in brake cylinder device 8 exceeds that in pipe 41, fluid under pressure will be supplied from supply conduit 10 to pipe 41 by way of the brake cylinder relay valve device 7, pipe 24 and check valve device 33, thereby recharging reservoir 32 and also, if the acknowledging valve device 30 is in normal position, recharging the large reservoir 31.

The check valve device 34 is interposed between a branch of the horn actuating pipe 27 and a branch of pipe 41 for permitting flow of fluid under pressure from pipe 27 to pipe 41 but preventing flow of fluid in the reverse direction, so that whenever the horn device 25 is actuated, pipe 41 may be recharged with fluid under pressure from supply conduit 10.

The magnet valve device 35 may be of any well-known type comprising an electro-magnet (not shown) and valve means (not shown) operable by energization of said magnet to connect a branch of supply conduit 10 to a branch of pipe 58, for thereby supplying fluid under pressure to the reservoir 31 and also, if the acknowledging valve device 30 is in normal position, to the pipe 41, reservoir 32 and control chambers 39 of the respective devices 28, 29; said valve means being operative, upon deenergization of said magnet, to disconnect the aforementioned branches of conduit 10 and pipe 58 from each other and dead-end said branches at the device 35.

One terminal of the magnet valve device 35 is connected to a source of electrical energy, such as a battery 59, by way of a battery supply wire 60; and the other terminal of said device is connected to a contact member 61 of device 36 by way of a wire 62.

As previously stated, the device 36 is associated with the usual controller device (not shown), which comprises a power control portion and a reversing control portion for controlling, respectively, the speed and direction of travel of an electric or diesel-electric locomotive. The reversing control portion controls operation, as by electrical means (not shown), of the contact member 61, such that when said portion calls for operation of the locomotive in a forward direction, said contact member will make contact with a wire 63, as shown in the drawing, and when said portion calls for operation in a reverse direction, said contact member will make contact with a branch of a battery return wire 64 for closing an electrical circuit and thus energizing the magnet valve device 35. This electrical circuit may also be closed, under certain conditions now to be described, when the contact member 61 engages the wire 63.

Wire 63 is connected to a contact arm 65 that is adapted to engage one of a plurality of contacts, such as 66, 67, 68 and 69, which are electrically connected to each other and to a branch of the battery return wire 64. The contact arm 65 is preferably connected for rotation with the aforementioned power control portion, such that when the driving motors of the locomotive are idling, said contact arm will engage contact 66, and as said power control portion calls for successive increases in speed up to a predetermined low speed corresponding to the position of contact 69, the contact arm 65 will successively engage contacts 67, 68, 69; but when a further increase in speed is called for, the arm 65 will move in a clockwise direction, as viewed in the drawing, out of engagement with the contact 69.

It will now be noted that the aforementioned electrical circuit will be closed and the magnet valve device 35 will consequently be energized, when contact member 61 engages battery return wire 64 directly, as during reversing, or through the medium of wire 63, contact arm 65, and any one of the contacts 66, 67, 68 or 69, as when the locomotive is standing or proceeding ahead within a low speed range, such as during starting and switching operations.

It should also be noted that the reservoir 31 and choke 41a may be of such sizes as to require any desired frequency of periodic operation of the acknowledging valve device 30, when the locomotive is traveling ahead at a speed in excess of that corresponding to the position of contact 69 of device 36.

*Operation*

In operation, assume initially that the main reservoir 2 is charged with fluid under pressure; that the locomotive is standing, with its driving motors idling; that the handle 9 of brake valve device 4 is in running position and the locomotive brakes are consequently released; that the safety control conduit 16 is charged with fluid under pressure; and that the handle 57 of acknowledging valve device 30 is in normal position.

Under the assumed conditions, the various components will be in the respective positions in which they are shown in Figs. 1 and 2 of the drawing. The circuit of the magnet valve device 35 will be closed by way of contact member 61, wire 63, contact arm 65, contact 66 and battery return wire 64, thereby energizing said magnet valve device and causing fluid under pressure to be supplied from the main reservoir 2 to supply conduit 10 and thence by way of said device and pipe 58 to the reservoir 31 and to the acknowledging valve device 30, whence it will flow via pipe 41 to the control chambers 39 of the respective devices 28, 29 and also to the reservoir or timing volume 32, thereby maintaining the latter devices in cut-off position and their control chambers fully charged with fluid under pressure, despite the flow of some of such fluid from pipe 41, at a slow rate controlled by choke 41a, to pipe 24 and thence via the brake cylinder relay valve device 7 to atmosphere.

Assuming now that the locomotive is backing, such as into a terminal to form a train, the contact member 61 of device 36 will have disengaged wire 63 and engaged the battery return wire 64 thereby maintaining the magnet valve device 35 energized and consequently maintaining the safety control portion charged with fluid under pressure in the manner just explained.

Assuming now that the locomotive moves forward, the contact member 61 will reengage wire 63 and the circuit of the magnet valve device 35 will remain closed, and said device will thus be energized, so long as the contact arm 65 maintains contact with one of the contacts 66, 67, 68 and 69; the latter contact, as previously stated, corresponds to a position of the power control portion of the aforementioned control device which calls for a certain predetermined speed above which safety control is desired. When an increase above such predetermined speed is called for, the contact arm 65 will be moved out of engagement with the contact 69, thereby opening the circuit of the magnet valve device 35 and causing de-energization of said device, with the result that the safety control portions will no longer be automatically charged with fluid under pressure by way of said device and the pipe 58.

Since the handle 57 of acknowledging valve device 30 is still in normal position, fluid pressure in both reservoirs 31 and 32, as well as in the control chambers 39 (Fig. 1) of devices 28, 29, will now blow down at a slow rate via choke 41a and the brake cylinder relay valve device 7, as previously described. When the pressure in pipe 41 has thus been reduced to the aforementioned predetermined value, the device 28 will move to normal position thereby establishing the connection 54 whereby fluid under pressure will flow from supply conduit 10 to the whistle 55 for warning the engineman that the handle 57 of the acknowledging valve device 30 must be moved from normal position to recharge position for recharging the safety control portion.

If the engineman promptly moves handle 57 to recharge position, the reservoir 31 will be connected by way of pipe 58 and device 30 to the supply conduit 10 for recharging said reservoir with fluid under pressure from the main reservoir 2. The engineman leaves the handle 57 in recharge position for a predetermined short period of time, determined by the selected capacity of reservoir 31 and flow rate through the conduit 10, and then returns said handle to normal position.

In the meantime, until the handle 57 of device 30 is returned to normal position, the whistle 55 will continue to sound, thereby warning the engineman that the acknowledgment operation has not been completed; and reservoir or timing volume 32 will supply a sufficient volume of fluid under pressure to pipe 41 to assure that, for a reasonable interval of time, the pressure in pipe 41, and hence in the control chamber 39 of device 29, will not deplete by way of choke 41a to the aforementioned predetermined lower value at which the device 28 will move to normal position and thereby initiate a safety control brake application.

If the handle 57 of acknowledging valve device 30 is thus returned to normal position within this reasonable interval of time, fluid under pressure will flow, in the manner previously described, from reservoir 31 to the pipe 41 and control chambers 39 of devices 28, 29, thereby causing the device 28 to return to its cut-off position in which the whistle 55 ceases to sound.

It will now be noted that the engineman must periodically move handle 57 of the acknowledging valve device 30 from normal position to recharge position and then back to normal position for demonstrating his alertness. If, however, he fails to or is unable to perform this acknowledging operation, the pressure of fluid in pipe 41 and the other components of the safety control portion will continue to blow down to atmosphere by way of choke 41a, until such pressure attains the aforementioned predetermined lower value at which the device 29 moves to normal position; whereupon the safety control conduit 16 will be vented to atmosphere by way of connection 54 of device 29, thereby causing the slide valve 19 of brake valve device 4 to move to application position. With the slide valve 19 in this position, fluid under pressure will be supplied to pipe 20 for actuating the power knockout device 21 to cut off power supply to the driving motors; the safety control conduit 16 will be independently vented to atmosphere by way of the predetermined lock-over port; and a service reduction in brake pipe pressure will occur. The brake controlling valve device 5 will respond to such reduction in brake pipe pressure to supply fluid under pressure from auxiliary reservoir 6 to the brake cylinder relay valve device 7, thereby causing the latter device to supply fluid at a corresponding pressure to the brake cylinder device 8 for effecting a safety control application of the locomotive brakes and also promptly unseating the check valve device 33. With check valve device 33 unseated, fluid under pressure will flow to the control chambers 39 of devices 29, 28 for actuating these devices, successively, to cut-off position for promptly disconnecting the safety control conduit 16 from atmosphere and then terminating the sounding of the whistle 55; this arrangement permits the train to get underway again more rapidly by promptly initiating recharging of the safety control system after a safety control brake application, as will be described presently.

In order to recapture control of the locomotive after a safety control brake application, the engineman, in accordance with the usual practice, must return the aforementioned controller device to an idle position and also move the handle 9 of the brake valve 4 from running position to lap position; both such operations being necessary to restore the power supply to the driving motors of the locomotive, and the latter operation also being necessary to close the aforementioned lock-over port by way of which the safety control conduit 16 has heretofore been independently vented as a result of movement of the slide valve 19 to application position.

With the controller device in idle position, the contact arm 65 of device 36 will engage the corresponding contact 66, thereby energizing the magnet valve device 35 for completing the recharging of the safety control system, which recharging had been initiated by way of the check valve device 33; it being noted that said magnet valve device supplies fluid at main reservoir pressure, whereas said check valve device admits fluid at merely brake cylinder pressure.

As soon as the lock-over port is closed by actuation of the handle 9 of brake valve device 4 to lap position, the safety control conduit 16 will be completely cut off from atmosphere; the device 29 having already moved to cut-off position. Hence the pressure in chamber 15 of brake valve device 4 will equalize into the chamber 14 and safety control conduit 16 at the rate controlled by bleed port 17 in piston 12, causing said piston and the slide valve 19 to return to normal position under action of spring 18. In normal position, the slide valve 19 will disconnect the conduit 16 from the lock-over port and also vent the power knockout actuating pipe 20 to atmosphere, thereby restoring the power supply to the driving motors. The handle 9 of brake valve device 4 should now be moved to either a release position or to running position for recharging the brake pipe 1 with fluid under pressure from the main reservoir 2 by way of the feed balve device 3 and thereby actuating the brake cylinder relay valve device 7 to vent fluid under pressure from the brake cylinder device 8 and thus release the locomotive brakes; so that the train may again get under way.

It will be noted that the check valve device 33 assures that the safety control portion, and particularly the control chamber 39 of device 29, will be promptly charged with fluid at a pressure at least sufficient to actuate the latter device to normal position, so that if the engineman moves the handle 9 of brake valve device 4 to lap position without first returning the controller device to idle position, the safety control conduit 16 will nevertheless be cut off from atmosphere at the device 29 and thus permit the slide valve 19 of brake valve device 4 to move to normal position, in the manner previously described. It should be noted, however, that at some time while the handle 9 of brake valve device 4 is in lap position, the controller device must be returned to idle position, otherwise power knockout device 21 will continue to shut off the power supply.

Assuming now, that with the train again underway at high speed, the engineman actuates the horn device 25, some of the fluid under pressure thus supplied to the horn actuating pipe 27 will flow to pipe 41 via the check valve device 34 if pipe 41 is not already charged to substantially main reservoir pressure. By thus boosting the pressure in pipe 41, this arrangement eliminates inconvenience to the engineman by deferring the next required acknowledging operation of the handle 57 of device 30.

Assume now that the engineman actuates the handle 9 of brake valve device 4 to service position or to an emergency position for effecting, respectively, a service or an emergency application of the brakes throughout the train, or that he actuates the handle of the usual independent brake valve device (not shown) for effecting an independent application of the locomotive brakes. Under any of these conditions, the brake cylinder device 8 will be charged with fluid under pressure and hence the blowdown of fluid pressure from the safety control portion by way of choke 41a will cease or, at least be retarded, depending upon the pressure differential, if any, across said choke; and, if the brake cylinder pressure exceeds the pressure in pipe 41, some fluid under pressure will flow via check valve device 33 to pipe 41 for recharging said safety control portion. This, of course, presupposes that the brake application is made while the aforementioned controller device is maintained in a position calling for a speed above that in which contact arm 65 engages contact 69, such as may be advisable when rounding a curve. On the other hand, if the throttle is returned toward or to idle position when the brakes are applied and contact arm 65 consequently engages one of the contacts 69, 68, 67 or 66, the safety control portion will be recharged primarily by way of the energized magnet valve device 35, assisted initially by supplementary recharging by way of check valve device 33 until the latter device is seated by attainment of a pressure in pipe 41 above that in the brake cylinder device 8.

*Summary*

It will now be seen that the improved fluid pressure brake apparatus embodies a safety control portion which requires periodic operation by the engineman while the locomotive is traveling above a certain predetermined low speed and safety control is therefore desirable; and that such safety control is automatically and desirably suppressed, to avoid inconvenience to the engineman, when such control is unnecessary, such as while the locomotive is standing, or his alertness is sufficiently assured under a variety of operating conditions, such as when the locomotive is reversing or proceeding ahead at low speed and when the horn is blown or the locomotive brakes are applied as a result of a manually initiated service or emergency train brake application or an independent application of the locomotive brakes.

It will also be seen that the engineman cannot nullify the safety control feature when it is cut into operation, and that compressed air requirements of the improved system are reduced to a minimum since blowdown of fluid under pressure through a choke 41a is to the brake cylinder pipe 24 instead of directly to atmosphere.

Having now described the invention, what I claim as new and desire to secure by Letters Patent, is:

1. In a fluid pressure brake apparatus of the type comprising a safety control conduit normally charged with fluid under pressure and means operative upon venting of said conduit to effect a safety control brake application, the combination of a second conduit charged with fluid under pressure, a third conduit, means for bleeding fluid from said third conduit at a controlled rate, a reservoir for storing fluid under pressure, an acknowledging valve device operable to one position and another position for opening said reservoir selectively to said second conduit and said third conduit, a warning device, and valve means controlled by pressure of fluid in said third conduit and operative upon a reduction in such pressure to a predetermined value to cause operation of said warning device and operative upon a further reduction in such pressure to a predetermined lower value to vent said safety control conduit to atmosphere, timing volume means of such capacity relative to the flow capacity of said bleeding means as to provide in said third conduit for a limited period of time while said acknowledging valve device is in its said one position fluid at a pressure exceeding said predetermined lower value, said valve means being operative when pressure in said third conduit is above said predetermined value to prevent operation of said warning device and ineffective to cause venting of said safety control conduit.

2. The combination according to claim 1, including second valve means normally in one position but actuable to another position for establishing connection between said second conduit and reservoir independently of said acknowledging valve device, and means controlling operation of said second valve means and mechanically controlled by an operator as an incident to his selection of desired vehicle speed and direction.

3. The combination according to claim 1, including a brake cylinder pipe having a first branch connected via said bleeding means to said third conduit, and check valve means arranged in parallel with said bleeding means and interposed between a second branch of said brake cylinder pipe and a branch of said third conduit for enabling flow of fluid under pressure from said brake cylinder pipe via said second branch to said third conduit and preventing flow in the reverse direction through said second branch.

4. The combination according to claim 1, including a horn actuating pipe chargeable with fluid under pressure from said second conduit for actuating a horn, and check valve means for enabling flow of fluid under pressure from said horn actuating pipe to a branch of said third conduit and preventing flow in the reverse direction.

5. In a fluid pressure brake apparatus of the type comprising a safety control conduit normally charged with fluid under pressure and means operative upon venting of said conduit to effect a safety control application of the brakes on a vehicle, the combination of a second conduit charged with fluid under pressure, a third conduit, means for bleeding fluid from said third conduit at a restricted rate, a warning device, a first reservoir for storing fluid under pressure, first valve means controlled by pressure of fluid in said third conduit and operative upon a reduction in such pressure to a predetermined value to actuate said warning device, second valve means controlled by pressure of fluid in said third conduit and responsive to a reduction in such pressure to a predetermined lower value to vent said safety control conduit, operator-controlled valve means movable selectively to a normal position for opening said first reservoir to said third conduit and to a recharge position for recharging said reservoir with fluid under pressure from said second conduit, a second reservoir for supplying fluid under pressure to said first and second valve means by way of said third conduit for a limited time while said operator controlled valve means is in recharge position, electrically controlled valve means operative upon closure of an electrical circuit to open said second conduit to said first reservoir in by-pass of said operator-controlled valve means, and means responsive to selection by the operator of one of a plurality of conditions of vehicle speed for closing said electrical circuit.

6. In a fluid pressure brake apparatus, the combination of a safety control conduit normally charged with fluid under pressure and ventable for initiating a safety control brake application, a second conduit charged with fluid under pressure from a source, a third conduit, means for bleeding fluid from said third conduit at a controlled rate, a reservoir, a warning device, first cut-off valve means controlled by pressure in said third conduit for cutting off a communication between said second conduit and said warning device except when such pressure is less than a predetermined value, and second cut-off valve means controlled by pressure in said third conduit for cutting off said safety control conduit from atmosphere except when such pressure is less than a predetermined lower value, timing volume means associated with said third conduit and of substantially smaller capacity than said reservoir, and operator-controlled valve means operable to a normal position for opening said reservoir to said third conduit and timing volume means and to a recharge position for opening said second conduit to said reservoir and closing off said reservoir from said third conduit and timing volume means.

7. The combination according to claim 6, including a brake cylinder pipe, a first valve device controlled jointly by pressures of fluid in said brake cylinder pipe and third conduit for supplying fluid under pressure to said third conduit when pressure in said brake cylinder pipe exceeds that in said third conduit, a horn actuating pipe normally vented but chargeable with fluid under pressure from said second conduit, a second valve device responsive to supply of fluid under pressure to said horn actuating pipe to supply fluid under pressure to said third conduit, a third valve device operative in one position to supply fluid under pressure from said second conduit to said reservoir independently of said operator-controlled valve means and in another position to cut off such independent supply; and means controlled by an operator as an incident to his selection of a desired vehicle speed and direction for thereby controlling operation of said third valve device.

8. In a fluid pressure brake apparatus of the type comprising a safety control conduit normally charged with fluid under pressure and means responsive to release of fluid under pressure from said conduit to initiate a safety control application of the brakes on a vehicle, the combination of a second conduit charged with fluid under pressure, a third conduit, flow-restricting means for releasing fluid under pressure from said third conduit at a restricted rate, a reservoir for storing fluid under pressure, valve means inoperative for releasing fluid under pressure from said safety control conduit so long as pressure of fluid in said third conduit is above a predetermined value and responsive to a reduction in pressure in said third conduit to below said predetermined value to release fluid under pressure from said safety control conduit, first operator-controlled valve means having one position for opening said reservoir to said third conduit and another position for closing said reservoir to said third conduit and recharging said reservoir with fluid under pressure from said second conduit, means providing a volume constantly open to said third conduit and of substantially lesser capacity than that of said reservoir, said volume serving to retard the rate of reduction in pressure of fluid in said third conduit while said first operator-controlled valve means is in its said other position, and other operator-controlled means operative to effect supply of fluid under pressure to said third conduit as an incident to actuation thereof for performing a desired control operation, thereby relieving an operator from the necessity of actuating said first operator-controlled valve means to said other position when his alertness has been demonstrated by his actuation of said other operator-controlled means.

9. In a fluid pressure brake apparatus of the type comprising a safety control conduit normally charged with fluid under pressure and means responsive to release of fluid under pressure from said conduit to initiate a safety control application of the brakes on a vehicle, the combination of a second conduit charged with fluid under pressure, a third conduit, means for releasing fluid under pressure from said third conduit at a restricted rate, a reservoir for storing fluid under pressure, a warning device, first valve means controlled by pressure of fluid in said third conduit and responsive to a reduction in such pressure to a predetermined value to actuate said warning device, second valve means controlled by pressure of fluid in said third conduit and responsive to a reduction in such pressure to a predetermined lower value to release fluid under pressure from said safety control conduit, a first operator-controlled device for selectively opening said reservoir to said third conduit or said second conduit, timing volume means of such capacity relative to the flow capacity through said fluid pressure releasing means as to provide in said third conduit fluid at a pressure exceeding said predetermined lower value for a limited period of time while said reservoir is opened to said second conduit, another operator controlled device, and means operative upon actuation of said other operator-controlled device to supply fluid under pressure to said second conduit in by-pass of said first operator-controlled and operative at all other times to prevent such supply.

10. In a fluid pressure brake apparatus of the type comprising a safety control conduit normally charged with fluid under pressure and means operative upon venting of said conduit to effect a safety control brake application, the combination of a second conduit charged with fluid under pressure, a third conduit, means for bleeding fluid from said third conduit at a restricted rate, a reservoir for storing fluid under pressure, an acknowledging valve device manually operable to one position and another position for opening said reservoir selectively to said second conduit and said third conduit, warning means controlled by pressure of fluid in said third conduit and operative upon a reduction in such pressure to a predetermined value to apprise an operator when said acknowledging valve device should be moved from said other position to said one position for recharging said reservoir, valve means controlled by pressure of fluid in said third conduit and operative upon the operator's failure to so move said acknowledging valve device and as a result of a consequent further reduction in such pressure to a predetermined lower value to vent said safety control conduit to atmosphere, and a timing volume for maintaining the pressure in said third conduit at a pressure above said predetermined lower value for a limited period of time while said acknowledging valve device is in its said one position, said warning means and valve means being inoperative to perform their respective above recited functions when pressure in said third conduit is above said predetermined value.

References Cited in the file of this patent

UNITED STATES PATENTS

| 1,545,751 | Fournia | July 14, 1925 |
| 1,649,044 | Thomas | Nov. 15, 1927 |
| 1,720,266 | Farmer | July 9, 1929 |

FOREIGN PATENTS

| 335,634 | Italy | Feb. 7, 1936 |